US012703326B2

(12) United States Patent
Laloi et al.

(10) Patent No.: US 12,703,326 B2
(45) Date of Patent: Aug. 11, 2026

(54) STREAMLINED WINDSCREEN WIPER

(71) Applicant: VALEO SYSTEMES D'ESSUYAGE, La Verriere (FR)

(72) Inventors: Nathalie Laloi, La Verriere (FR); Guillaume Barret, La Verriere (FR)

( * ) Notice: Subject to any disclaimer, the term of this patent is extended or adjusted under 35 U.S.C. 154(b) by 0 days.

(21) Appl. No.: 18/578,407

(22) PCT Filed: Jul. 13, 2022

(86) PCT No.: PCT/EP2022/069599
§ 371 (c)(1),
(2) Date: Jan. 11, 2024

(87) PCT Pub. No.: WO2023/285528
PCT Pub. Date: Jan. 19, 2023

(65) Prior Publication Data

US 2024/0294143 A1 Sep. 5, 2024

(30) Foreign Application Priority Data

Jul. 13, 2021 (FR) ...................................... 2107626

(51) Int. Cl.
*B60S 1/38* (2006.01)

(52) U.S. Cl.
CPC ..... *B60S 1/3806* (2013.01); *B60S 2001/3822* (2013.01)

(58) Field of Classification Search
CPC .................. B60S 1/3801; B60S 1/3806; B60S 2001/3815; B60S 2001/3813
USPC .......................................... 15/250.44, 250.46
See application file for complete search history.

(56) References Cited

U.S. PATENT DOCUMENTS 4,896,987 A * 1/1990 Pethers ................. B60S 1/3801 15/250.46
9,643,573 B2 5/2017 Oslizlo et al.
2011/0083295 A1* 4/2011 Kim ...................... B60S 1/3801 15/250.32
2012/0297565 A1* 11/2012 Beelen .................. B60S 1/3891 15/250.31

(Continued)

FOREIGN PATENT DOCUMENTS

GB 2440308 A 1/2008
JP 2006089043 A 4/2006

(Continued)

OTHER PUBLICATIONS

European Patent Office, International Search Report and Written Opinion of corresponding International Application No. PCT/EP2022/069599, dated Sep. 27, 2022.

(Continued)

*Primary Examiner* — Katina N. Henson
(74) *Attorney, Agent, or Firm* — Valeo Systemes d'Essuyage

(57) ABSTRACT

The streamlined flat windscreen wiper comprises a longitudinal wiper blade, a longitudinal streamlined fairing comprising a central mounting and at least one end cap, and at least one caliper comprising claws for retaining said longitudinal wiper blade, and further comprises at least one adapter element fixed to the central mounting at a distal end thereof, a proximal end of the at least one end cap and said at least one caliper being pivotably articulated to said at least one adapter element.

10 Claims, 8 Drawing Sheets

(56) References Cited

U.S. PATENT DOCUMENTS

| | | | |
|---|---|---|---|
| 2015/0020341 | A1 | 1/2015 | Huang |
| 2015/0375716 | A1 | 12/2015 | An |
| 2017/0080901 | A1 | 3/2017 | Houssat et al. |

FOREIGN PATENT DOCUMENTS

| | | | |
|---|---|---|---|
| JP | 2006312457 | A | 11/2006 |
| JP | 2016011105 | A | 1/2016 |

OTHER PUBLICATIONS

Japan Patent Office, Search Report (with English translation) of corresponding Japanese Patent Application No. 2024-501795, dated Feb. 17, 2025, 20 pages.

Japan Patent Office, Office Action (with English translation) of corresponding Japanese Patent Application No. 2024-501795, dated Feb. 19, 2025, 8 pages.

* cited by examiner

STREAMLINED WINDSCREEN WIPER

TECHNICAL FIELD

The invention relates to a streamlined windscreen wiper for motor vehicles, and more particularly to an articulation means for said streamlined windscreen wiper.

BACKGROUND OF THE INVENTION

In vehicle windscreen wipers, it has become more and more desirable to integrate a streamlining aspect into the windscreen wiper, to the extent that the streamline elements form a substantial portion of the structure of the wiper blade. Such wiper blades are commonly referred to as "hybrid" wiper blades.

A streamlined aspect presents a number of advantages, most notably reducing the drag force from the airflow incident on the windscreen wiper. The streamlined shape may also notably be configured to generate a downforce on the wiper when air flows over it, pressing the wiper into the windscreen and improving wiping performance. The streamlined shape also presents a more pleasing aesthetic aspect than a wiper blade configured in the more traditional style of nested tournament arms.

Generally, the streamlining aspect is implemented in the form of a rigid fairing that forms a portion of the structure of the wiper blade. The fairing generally comprises several individual pieces, which are articulated to each other so as to permit the wiper blade to flex and follow the curvature of the windscreen as the wiper blade passes over it. Additionally, and depending upon the length of the blade, the wiper may include a single level of tournament arms (also known as "calipers") articulated to the fairing which retain the wiper rubber, to more evenly distribute the force of the wiper arm along the length of the wiper blade.

In this way, the fairing constitutes a significant part of the structure of the wiper blade, simplifying its construction.

However, since the wiper blade's fairing constitutes a structural element, the articulations between the fairing elements must be sufficiently robust to bear all of the forces incident upon the windscreen wiper during operation, in particular the lateral forces (i.e. substantially parallel to the plane of the windscreen and perpendicular to a longitudinal axis of the wiper blade), and any torsional forces that are transmitted through the calipers to the wiper blade main structure. These forces may cause the fairing to flex to an impermissible degree, which may consequently lead to a disarticulation of the fairing and a failure of the wiper blade.

There is thus a need to provide a reinforced articulation in a hybrid windscreen wiper blade.

SUMMARY OF THE INVENTION

According therefore, to the invention, there is presented a streamlined flat windscreen wiper, in particular for a vehicle, comprising a longitudinal wiper blade, a longitudinal streamlined fairing comprising a central mounting and at least one end cap disposed at a distal end of said central mounting, and at least one caliper comprising claws for retaining said longitudinal wiper blade and said at least one stiffening element.

According to a first aspect, the streamlined windscreen wiper further comprises at least one adapter element, the at least one adapter element being fixed to the central mounting at a distal end thereof, a proximal end of at least one end cap and said at least one caliper being pivotably articulated to said at least one adapter element.

Such a configuration is advantageous in that the adapter element reinforces the articulation between the central mounting and the end cap. In particular, the fact that the calipers are articulated to the adapter and not directly to one of the fairing elements permits a better distribution of the forces on the wiper blade, reducing the likelihood that the blade will come apart during use.

In a preferred embodiment, the at least one adapter element further comprises a reinforcing portion extending from a distal end of said adapter element, said reinforcing portion engaging a complementary structure in the end cap.

Such a configuration is advantageous in that it creates a rigid, interlocking interface between the central mounting, the end cap, and the caliper, which is resistant in particular to lateral forces exerted on the wiper blade as a result of the wiping action.

In a particularly preferred embodiment, the reinforcing portion has a reduced width relative to the rest of the adapter element.

This is advantageous in that the adapter element is particularly rigid at the point where it engages the end cap, further strengthening the articulation.

In a preferred embodiment, the complementary structure comprises two ribs extending from a lower surface of the end cap, the reinforcing portion being lodged between said two ribs.

This is advantageous in that it provides an improved mechanical coupling between the adapter and the end cap, in a manner which is easy to provide using conventional injection-moulding methods known in the art.

In a particularly preferred embodiment, the reinforcing element has a cross-section in the form of an inverted U.

This is advantageous in that the caliper will set itself within the reinforcing element at least partially, thereby further reinforcing the mechanical coupling of the articulation and improving its robustness.

In a possible embodiment, the adapter element further comprises a pivot pin, the caliper being rotatably articulated on the pivot pin.

Preferably, the axis of the pivot pin and the axis of articulation of the end cap are distinct.

Preferably, the complementary structure comprises two substantially planar surfaces substantially parallel with a longitudinal axis of the windscreen wiper, the caliper being accommodated in the space defined by said planar surfaces.

In another aspect, the invention is directed towards a windscreen wiper system comprising a wiper arm, a drive motor configured to drive the wiper arm in a reciprocating motion, and a windscreen wiper as described above.

In another aspect, the invention is directed towards a vehicle comprising a windscreen wiper or a windscreen wiper system as described above.

The skilled person will understand that the aspects and features of the invention as described above, and other aspects and features that may be discussed below and/or illustrated in the Figures, may be combined in any permutation, without departing from the scope of the invention.

BRIEF DESCRIPTION OF DRAWINGS

These and other aspects, features, and advantages of the invention will be readily appreciated when considered in the light of the following Figures.

DETAILED DESCRIPTION OF THE INVENTION

Turning now to the Figures, the invention will be better understood by an investigation thereof. While the following discussion is oriented towards a single articulation of the windscreen wiper 100, it will be readily understood that a windscreen wiper could comprise the invention on one or several articulations thereof.

Additionally, when relative terms such as "upper" and "lower" are employed, it will be understood that such terms are used in reference to the windscreen wiper when placed with the rubber wiper blade on a horizontal plane, with "upper" and "lower" in particular being used in reference to the force of gravity in the ordinary fashion.

Figure 1:
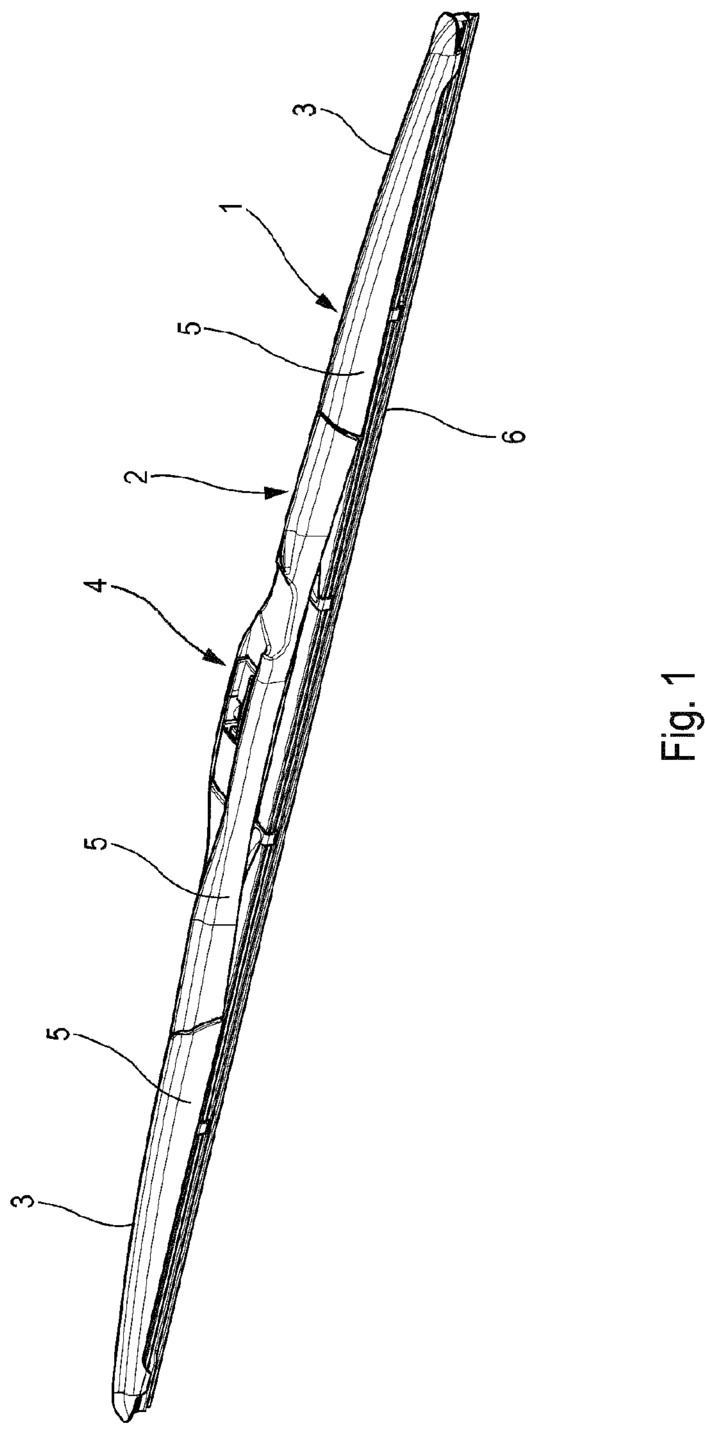
FIG. 1 is a perspective view of a streamlined wiper blade according to a first embodiment of the invention.

FIG. 1 illustrates a streamlined windscreen windscreen wiper 1. The windscreen wiper 1 is, structurally, comprised of a central portion, the central mounting 2, as well as two end caps 3 and an arm adaptor 4. Together the central mounting 2 and end caps 3 together present an aerodynamically-streamlined deflector 5, the deflector 5 extending the length of the windscreen wiper 1 and formed in a topmost surface, i.e. the surface opposite a windscreen upon which the blade is used.

The central mounting 2 moreover has an adapter section 4 disposed at its center, to permit the windscreen wiper 1 to be attached to a windscreen wiper arm of a vehicle, in the manner commonly known in the art.

The central mounting 2 and end caps 3 are formed in a rigid thermoplastic material, which is sufficiently strong to bear all of the loads that are placed on the wiper blade during use. In this way, the central mounting 2 and end caps 3 constitute essentially the structure of the wiper blade.

On a side opposite the deflector 5 is a rubber wiper blade 6, which is retained in the windscreen wiper 1 by a series of hooks which will be discussed below in relation to FIGS. 2 and 3. The end caps 3 are articulated to the central mounting 2, and in combination with the series of hooks, the windscreen wiper 1 will conform to the shape of the windscreen to realize an effective wiping performance.

Figure 2:
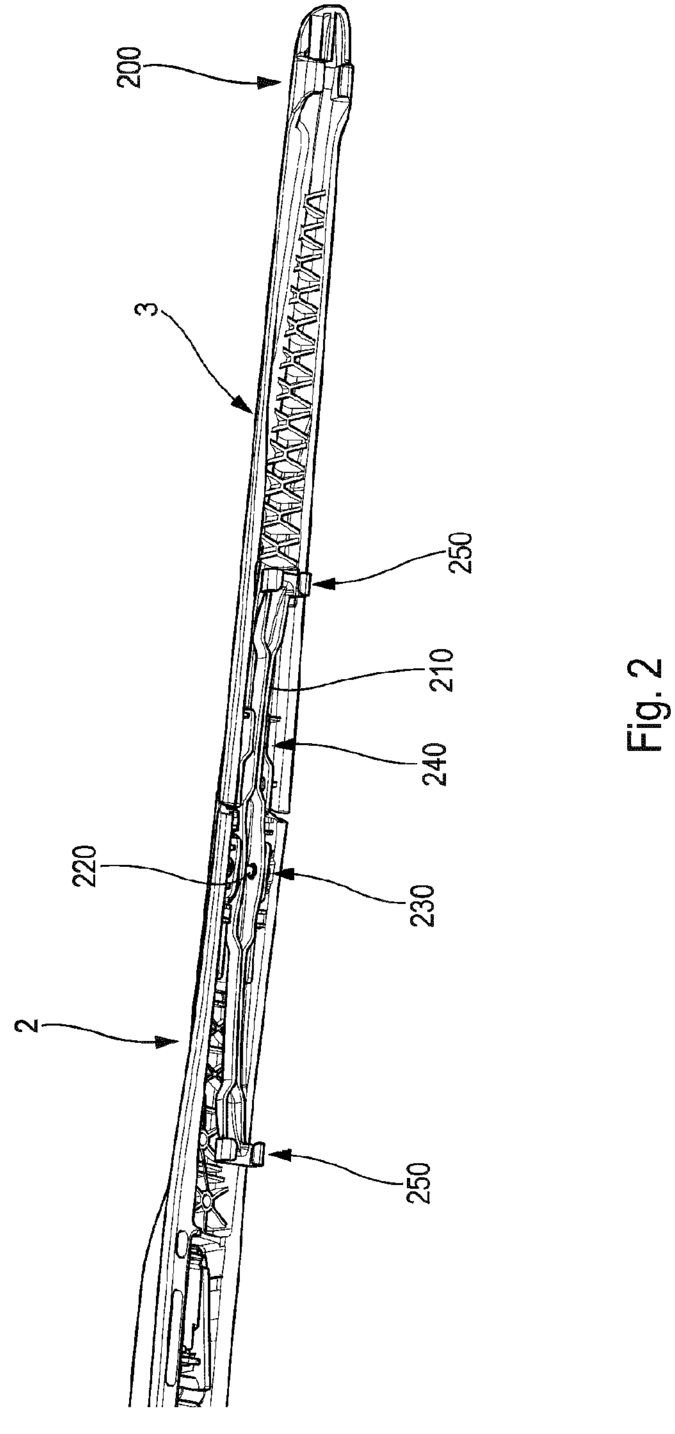
FIG. 2 is a perspective view of the underside of the streamlined wiper blade of FIG. 1.

FIG. 2 illustrates the wiper blade of FIG. 1, from the underside, i.e. the side opposite the deflector 5. In particular, FIG. 2 illustrates the central mounting 2 and one of the end caps 3; the other end cap 3, as well as the rubber wiper blade 6, is omitted for clarity.

Each of the end caps 2 present a pair of hooks 200, disposed at a distal end thereof. The hooks 200 engage the wiper rubber and retain it in place, while permitting a relative motion between the wiper rubber and the end cap along the longitudinal axis of the windscreen wiper 1. This permits the windscreen wiper 1 to conform to the shape of the windscreen upon which it is used.

The windscreen wiper 1 further comprises two calipers 210, one of which is illustrated in FIG. 2. The caliper 210 is articulated to the central mounting 1 at a distal end thereof, by way of a pivot pin 220. The pivot pin 220 is disposed at a central portion 230 of the caliper 210. Two arms 240 extend from the central portion 230 of the caliper 210, and are terminated at each end by a pair of claws 250.

The claws 250 firmly retain the wiper rubber, in both the lateral and longitudinal directions, thereby fixing the wiper rubber to the wiper blade. The shape of the caliper 210, and the articulation of the caliper 210 at the pivot pin 220 permits the windscreen wiper 1 to better conform to the shape of the windscreen, and additionally will evenly distribute the force of the wiper arm along the length of the wiper rubber. In this way, the wiping performance of the windscreen wiper 1 is optimized.

Figure 3:
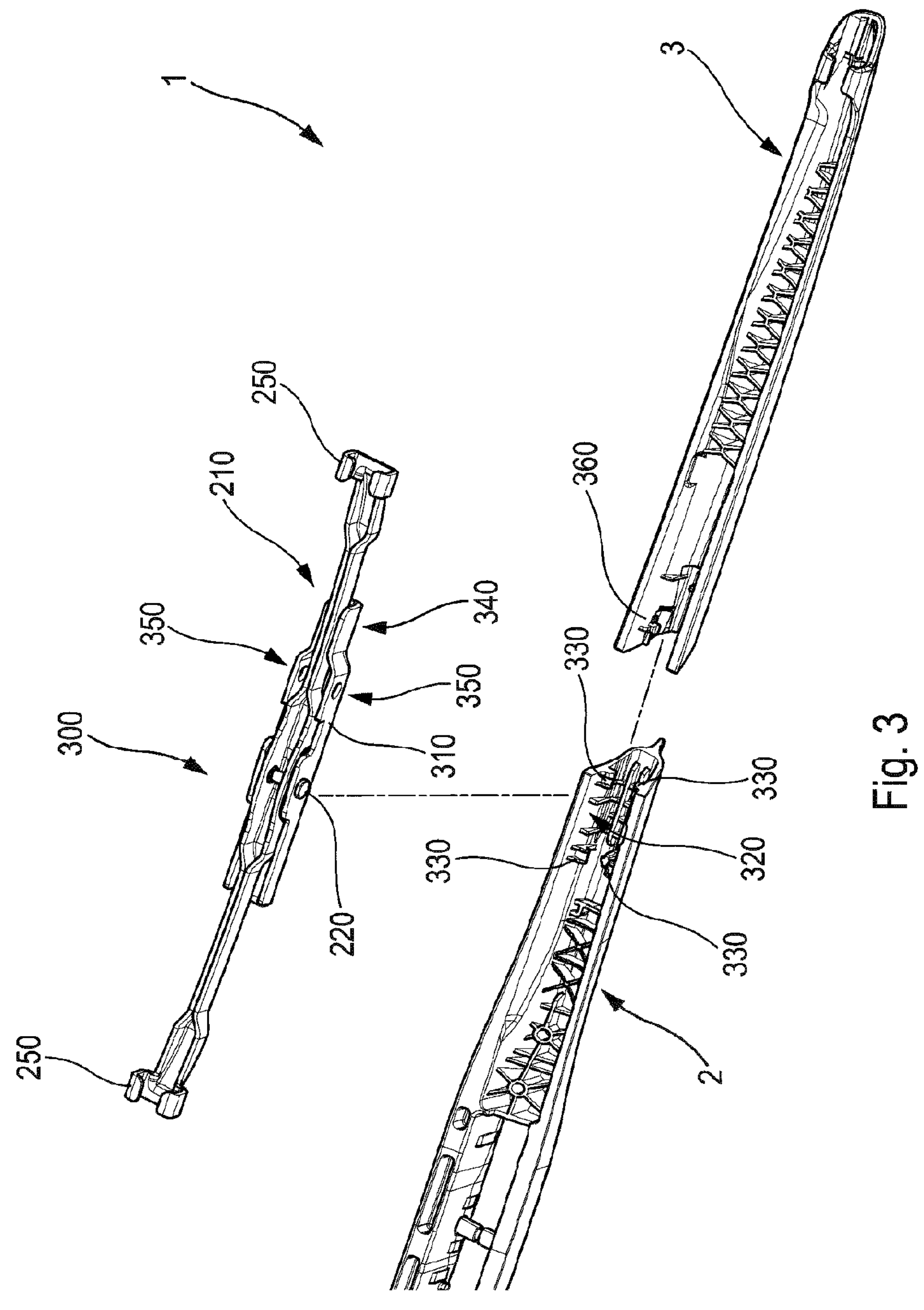
FIG. 3 is an exploded view of the wiper blade of FIG. 1.

FIG. 3 is an exploded view of the windscreen wiper 1 illustrated in FIG. 2. The mounting and articulation of the caliper 210 will be discussed. As can be seen in FIG. 3, the caliper 210 is not articulated directly to the central mounting 2, but is actually mounted to an adapter element 300.

The adapter element 300 comprises a body portion 310 in the general form of an inverted U, which bears the pivot pin 220 as depicted in FIG. 3. The central portion 230 of the caliper 210, being also in the form of an inverted U, thus fits neatly within the body portion 210 of the adapter element 300. The body portion 310 is configured to be received in a seat 320 formed at a distal end of the central mounting 2. The seat 320 comprises locating means (not shown) and a plurality of retaining clips 330; the locating means and the retaining clips 330 securely retain the adapter element 300, and by extension the caliper 210 and the wiper rubber.

At a distal end, the adapter element 300 narrows in width, forming the extension portion 340. The interior width of the extension portion 340 is substantially the same as the exterior width of the arm 240 of the caliper 210, and the arm 240 is received therein substantially as illustrated in FIG. 3.

Moreover, the adapter element 300 comprises two articulation holes 350, disposed opposite each other at a distal end of the body portion 310 of the adapter. The articulation holes 350 are configured to accommodate the two articulation pins 360, which are formed integrally with the end cap 3 and disposed on opposing faces of the interior surface of the end cap 3 at a proximal end thereof. In this way, the adapter element 300 serves to articulate both the end cap 3 and the caliper 210 to the central mounting 2.

Figure 4:
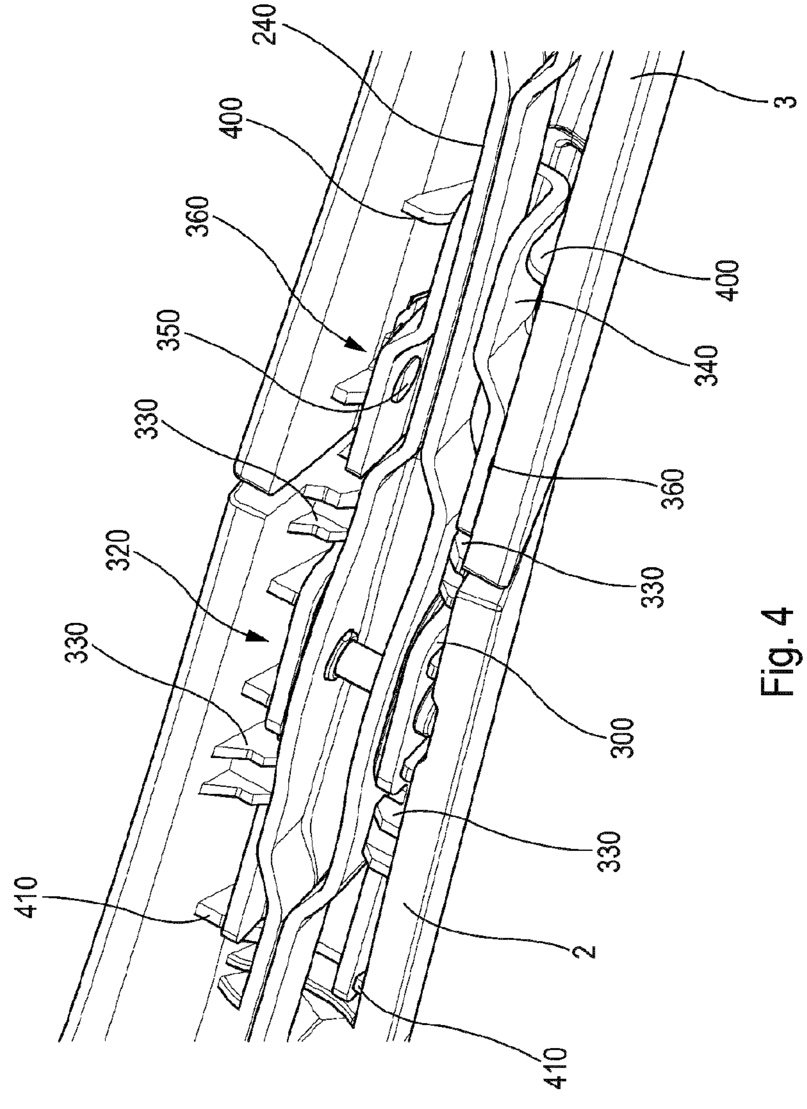
FIG. 4 is a detail view of the streamlined wiper blade of FIG. 1.

FIG. 4 illustrates in greater detail the central mounting 2, end cap 3, caliper 210, and adapter element 300, in an assembled state. It will be particularly noted that the adapter element 300 extends beyond the edge of the central mounting 2, such that the articulation holes 350 are disposed outboard of the central mounting 2. This positioning ensures that the end cap 3 may pivot freely with respect to the central mounting 2.

Moreover, the end cap 3 comprises a pair of ribs 400 extending from a lower internal surface of the end cap, as illustrated in FIG. 4. The ribs 400 are disposed such that when the adapter element 300 is mounted in the central mounting 2 and the end cap 3 is articulated to the adapter, as shown, the extension portion 340 is securely lodged between the ribs 400, and the arm 240 is securely lodged within the extension portion 340.

Likewise, the central mounting comprises a pair of ribs 410 which engage the adapter element 300, so as to further rigidify the connection between the adapter element 300 and the central mounting 2. In particular, the ribs 410 bear at least a portion of the lateral loads incident upon the adapter element 300, taking a portion of this loading from the hooks 300 which otherwise retain the adapter element 300 in the seat 320.

This nested arrangement of the arm 240 of the caliper 210 within the extension portion 340, within the ribs 400 of the end cap 3, serves to rigidly lock together these components in the lateral direction, i.e. perpendicular to the longitudinal axis of the windscreen wiper 1 and parallel to the plane of the windscreen, while still allowing free rotation of the caliper 210. In this way, the articulation of the various components of the wiper blade is reinforced against the forces which are most commonly encountered during a wiping operation, while still allowing them to pivot freely to follow the curvature of the windscreen.

The adaptor 300 is optionally fabricated from a plastic material, in particular by injection molding, so as to minimize cost and weight and reduce the likelihood of corrosion. However, to further reinforce the assembly and provide additional resistance, a U-shaped metallic doubling element 420 may be provided. The doubling element can be provided as a separate component, as illustrated in FIG. 4, or alternatively integrated into the adapter element 300 by an overmolding process.

Alternatively, in certain situations it may be advantageous to provide the adaptor in metal and the doubling element in plastic, according to the particular needs of the application in question.

Figure 5:
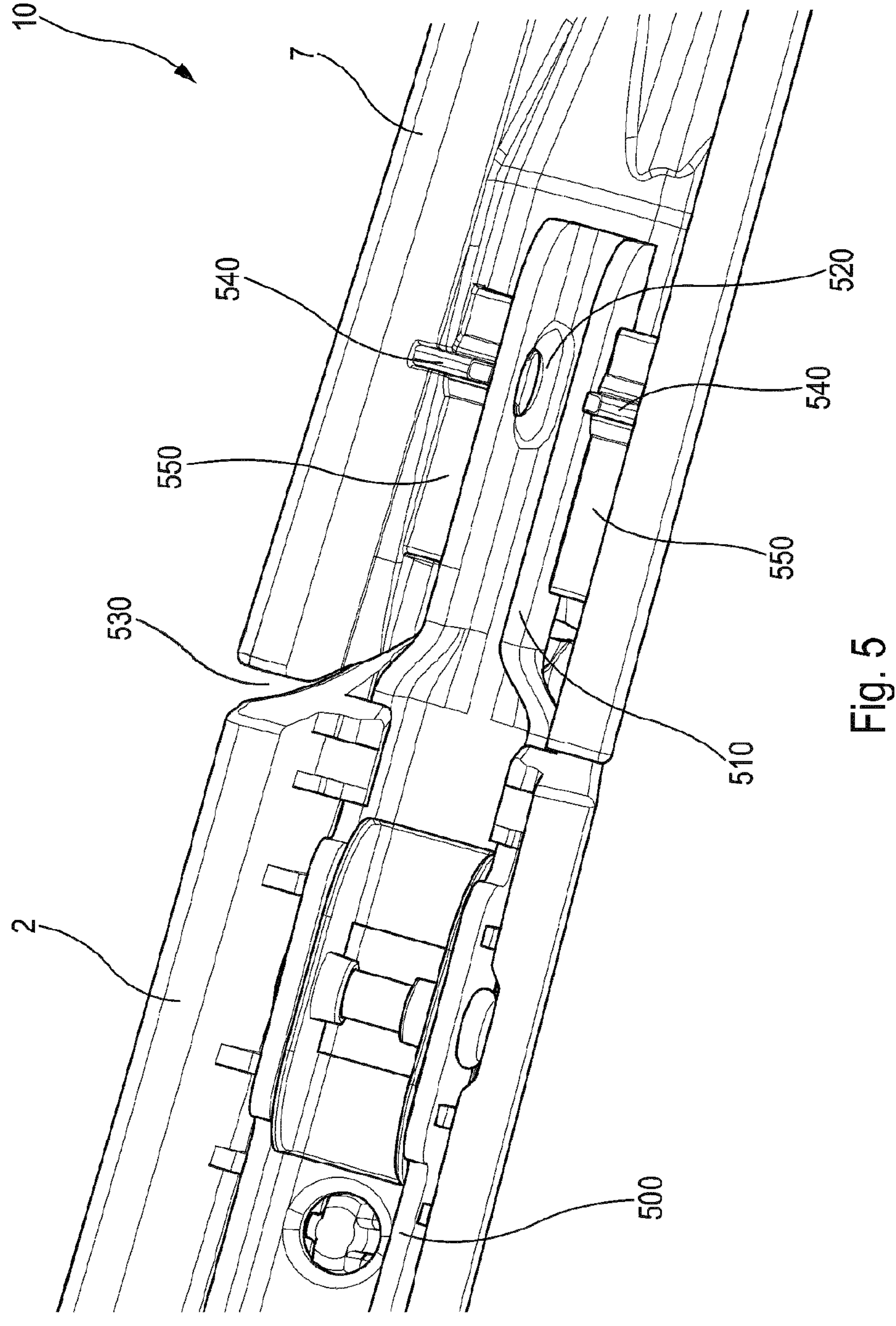
FIG. 5 is a detail view of a streamlined windscreen wiper blade according to a second embodiment of the invention.

FIG. 5 presents a possible variant embodiment of the invention, in a windscreen wiper 10. The adapter element 500 is similar to the adapter element 300 discussed above, with the notable exception of the extension portion 510. The extension portion 510 of the adapter element 500 is made longer than the extension portion 340 of the adapter element 300. Consequently, the articulation holes 520, and the corresponding articulation pins of the end cap 7, are displaced outwardly, towards a distal end of the windscreen wiper 10.

Consequently, the pivot axis of the end cap 7 is displaced outwards. This displacement permits the end cap 7 to pass freely in rotation past the distal end of the central mounting 2 at the gap 530, without contacting, and thus avoiding damage or disarticulation of the windscreen wiper 10 as a result.

This is particularly advantageous when the end cap 7 is wrenched upwards, such as is the case where the rollers and/or brushes of an automatic car wash come in contact with the windscreen wiper; the outwardly-displaced articulation will result in the torsional force generated by this motion being borne by the adapter element 500.

Moreover, the displacement of the articulation outwards enables a reinforcement of the nested arrangement of the caliper (not depicted for clarity), the adapter element 500, and the end cap 7. Notably, in addition to the vertical ribs 540, the end cap is provided with horizontal ribs 550, the ribs 540 and 550 extending from the pivot pin 520. The horizontal ribs 550 offer a particular resistance to lateral loading, especially when the caliper is nested in the extended portion 510 as described in relation to the preceding embodiment and Figures.

In this way, the articulations of the windscreen wiper 10 are further solidified, rendering it even more resistant to dislocation at the articulation between the end cap 7 and the adapter element 500.

Figure 6A:
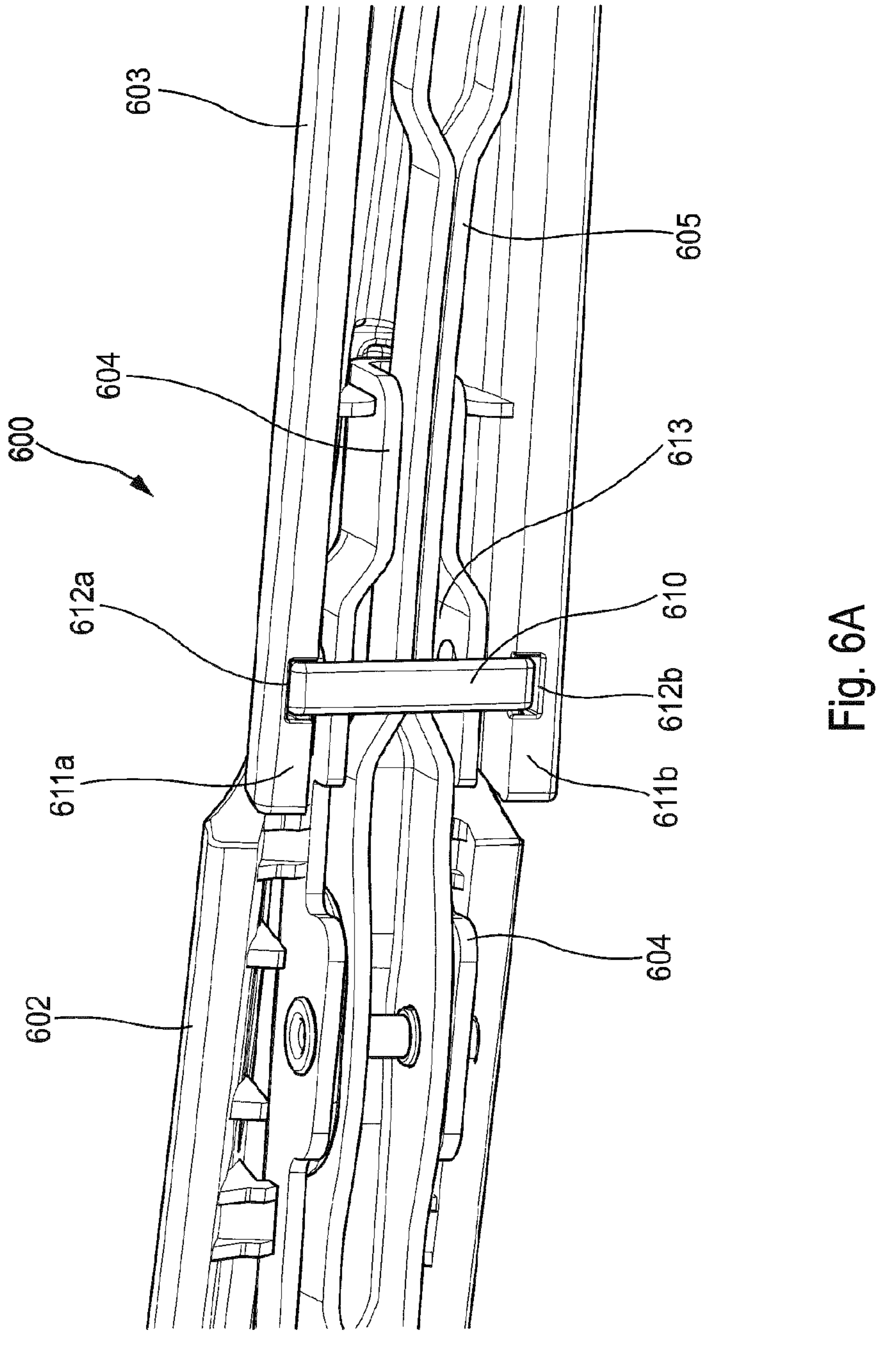
FIG. 6A is a variant of the streamlined windscreen wiper blade according to the invention.

FIG. 6A illustrates an additional variation on the streamlined windscreen wiper. In particular, FIG. 6A depicts this variant from the underside of the windscreen wiper 600. As with the embodiments presented in the preceding Figures, the streamlined windscreen wiper 600 comprises a central mounting 602 and two end caps 603, of which one is illustrated. The windscreen wiper 600 also comprises an adapter element 604, to which is articulated a caliper 605.

This variation is distinguished by the presence of the staple clip 610. The staple clip 610 extends across the flanks of the end cap 603, from the forward flank 611*a* to the rear flank 611*b*. The staple clip 610 is inserted into the slots 612*a*, 612*b*, and retained firmly therein. The staple clip 610 is ideally fabricated from sheet metal, as such is simple and inexpensive to fabricate, but may alternatively be provided in other suitable materials such as thermoplastics.

By its engagement in the end cap 603, the staple clip 610 will prevent the flanks 611*a*, 611*b* from separating, especially in situations where the wiper blade is placed under significant loads, e.g; when covered in snow or when iced to the windscreen.

Consequently, the staple clip 610 prevents the disarticulation of the end cap 603, since when the staple clip 610 is in place, the flanks 611*a*, 611*b* of the end cap 603 cannot spread far enough apart to permit the articulation pins 613 to disengage from the adapter element 604.

Figure 6B:
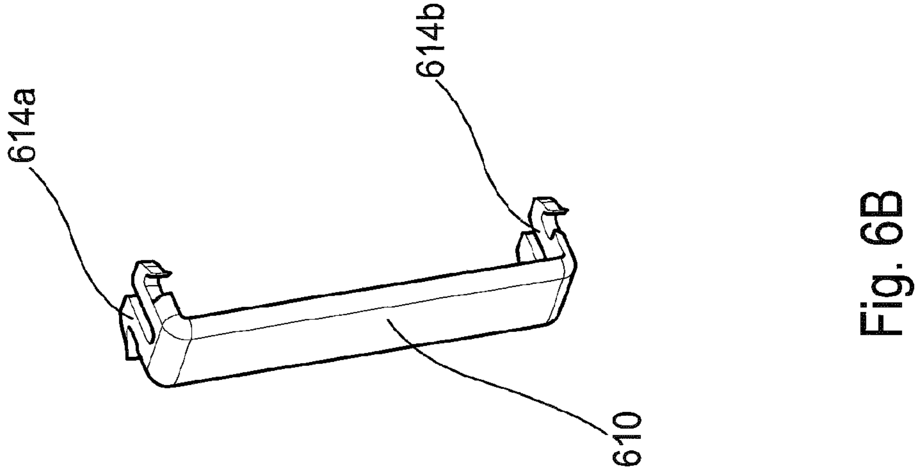
FIG. 6B is an isolated detail view of a staple clip of the variant streamlined windscreen wiper blade of FIG. 6A.

FIG. 6B illustrates the staple clip 610 in further detail. The staple clip 610 is in the general form of a strip of metal, which is bent at least at longitudinal extremities thereof to provide the two retention tabs 614*a*, 614*b*. The retention tabs 614*a*, 614*b* engage in the slots 612*a*, 612*b* respectively, to durably retain the staple clip 610 in the end cap 603. Optionally, the retention tabs 614*a*, 614*b* comprise barbed or sawtooth-shaped edges, as depicted in FIG. 6B, which bite into the end cap 603 and better retain the staple clip 610.

Figure 7:
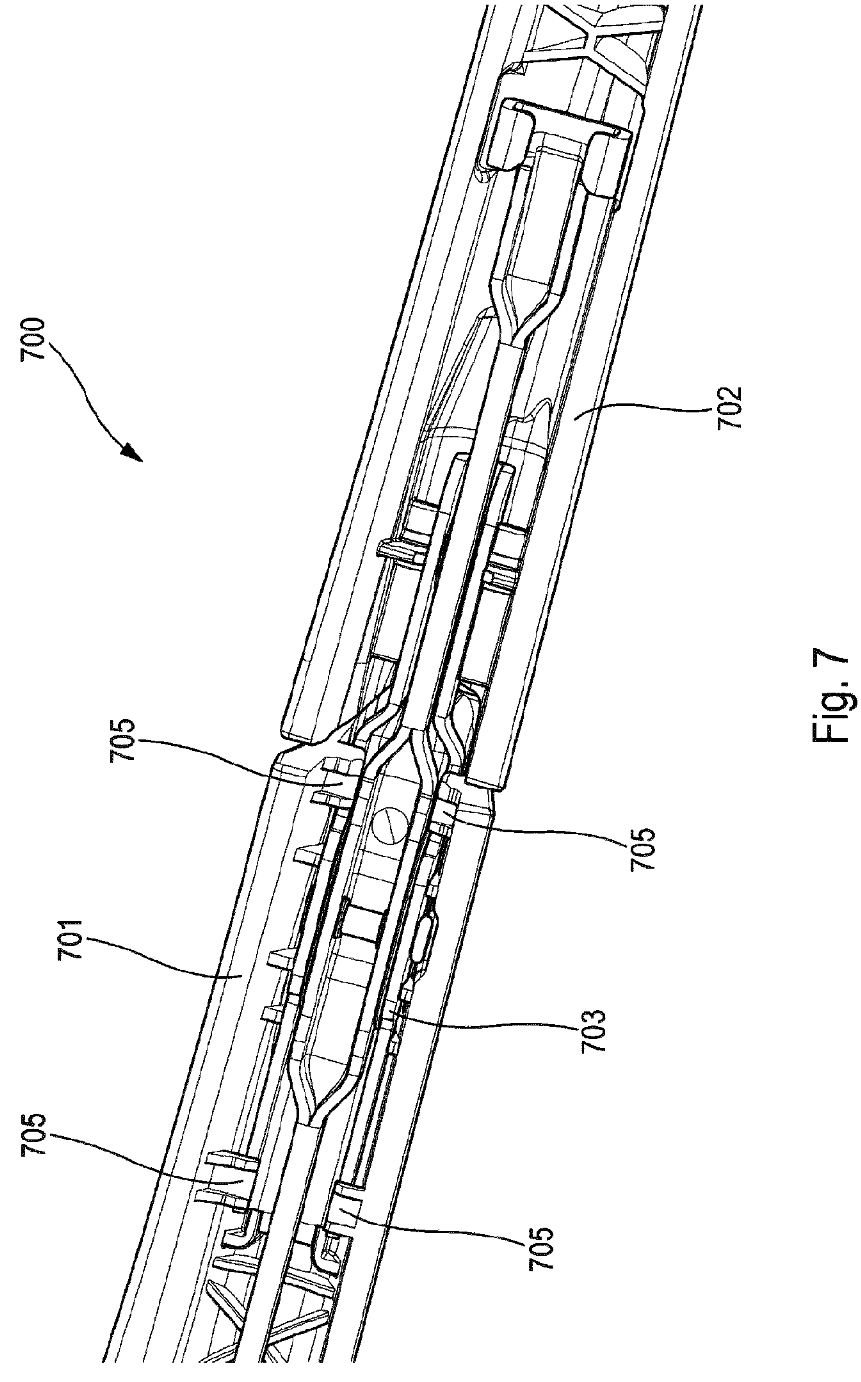
FIG. 7 is a detail view of a streamlined windscreen wiper blade according to a third embodiment of the invention.

FIG. 7 illustrates a windscreen wiper 700 according to a third embodiment of the invention. The windscreen wiper 700 comprises a central mounting 701 and two end caps 702, of which one is illustrated in FIG. 7. The windscreen wiper 700 further comprises an adapter element 703.

It will be apparent that the windscreen wiper 700 incorporates many of the aspects of the embodiments described above. However, the windscreen wiper 700 differs in that the retaining clips 705 are disposed at the longitudinal extremities of the adapter element 703.

This is advantageous, in particular relative to the configuration illustrated in e.g. FIGS. 2 and 4, in that the effect of the retaining clips 705 in providing torsional rigidity to the windscreen wiper 700 is improved.

Of course, other variations of the invention may be envisaged in light of the foregoing, and the description of the exemplary embodiments presented herein should not be considered as exhaustive.

LIST OF REFERENCE SIGNS

Windscreen wiper 1, 10, 600, 700
Central mounting 2, 602, 701
End cap 3, 603, 702
Arm adaptor 4
Deflector 5
Rubber wiper blade 6
Hook 200
Caliper 210, 605
Pivot pin 220
Central portion 230
Arm 240
Claws 250
Adapter element 300, 500, 604
Body portion 310
Seat 320
Retaining clip 330, 705

Extension portion 340, 510
Articulation hole 350, 520
Articulation pin 360, 613
Rib 400, 410, 540, 550
Doubling element 420
Gap 530
Staple clip 610
Flank 611*a*, 611*b*
Slot 612*a*, 612*b*
Retention tab 614*a*, 614*b*

What is claimed is:

1. A windscreen wiper for a vehicle, comprising:
a longitudinal wiper blade;
a longitudinal streamlined fairing including a central mounting;
an end cap disposed at a distal end of the central mounting;
a caliper with at least two claws for retaining the longitudinal wiper blade, the caliper combined with a reinforcing portion secured together by a pivot pin to form a body portion;
an adapter element fixed to the central mounting at a distal end thereof, wherein the adapter element further includes the reinforcing portion and the caliper with said claws extending from a distal end of the adapter element;
the caliper nested within the reinforcing portion, wherein walls of the caliper taper into a form of an elongated hexagonal shape within the reinforcing portion and along a longitudinal direction of the adapter element;
and the body portion configured to clip within each cavity of the central mounting and end cap and be configured to retain the central mounting and the end cap together.

2. The windscreen wiper of claim 1, the reinforcing portion engaging a complementary structure in the end cap, wherein the complementary structure includes at least two ribs extending from a lower surface of the end cap, the reinforcing portion being lodged between said at least two ribs.

3. The windscreen wiper of claim 2, wherein the complementary structure includes two substantially parallel planar surfaces substantially parallel with a longitudinal axis of the windscreen wiper, the caliper being accommodated in a space defined by said planar surfaces.

4. The windscreen wiper of claim 1, wherein the reinforcing portion has a cross-section in a form of an inverted U.

5. The windscreen wiper of claim 1, wherein the adapter element further includes a pivot pin, the caliper being rotatably articulated on the pivot pin.

6. The windscreen wiper of claim 5, wherein the axis of the pivot pin and an axis of the articulation pins of the end cap are distinct.

7. A vehicle comprising a windscreen wiper according to claim 1.

8. A windscreen wiper of claim 1, wherein a staple clip extends across flanks of the end cap.

9. A windscreen wiper for a vehicle, comprising:
a longitudinal streamlined fairing including a central mounting;
an end cap disposed at a distal end of the central mounting;
a caliper with at least two claws configured to retain the longitudinal wiper blade, the caliper interfacing a reinforcing portion and secured together by a pivot pin forming a body portion;
an adapter element fixed to the central mounting at a distal end thereof,
wherein the adapter element further includes the reinforcing portion and the caliper with said claws extending from a distal end of the adapter element;
the caliper nested within the reinforcing portion,
wherein walls of the caliper taper into diagonal pathways within the reinforcing portion along a longitudinal direction of the adapter element;
and the body portion configured to clip within each cavity of the central mounting and end cap, the body portion configured to retain the central mounting and the end cap together.

10. A windscreen wiper of claim 9, wherein a staple clip extends across flanks of the end cap.

* * * * *